US009773369B2

(12) United States Patent

Berman et al.

(10) Patent No.: US 9,773,369 B2
(45) Date of Patent: Sep. 26, 2017

(54) GAMING DEVICE IMPLEMENTING MULTI-REEL SYMBOLS FROM PRIOR GAME RESULTS

(71) Applicant: KING SHOW GAMES, INC., Minnetonka, MN (US)

(72) Inventors: Bradley Berman, Minnetonka, MN (US); Gregg Palmer, Seattle, WA (US)

( * ) Notice: Subject to any disclaimer, the term of this patent is extended or adjusted under 35 U.S.C. 154(b) by 302 days.

(21) Appl. No.: 14/574,563

(22) Filed: Dec. 18, 2014

(65) Prior Publication Data

US 2015/0170462 A1 Jun. 18, 2015

Related U.S. Application Data

(60) Provisional application No. 61/917,379, filed on Dec. 18, 2013.

(51) Int. Cl.
*A63F 13/00* (2014.01)
*G07F 17/32* (2006.01)
*G07F 17/34* (2006.01)

(52) U.S. Cl.
CPC .......... *G07F 17/3213* (2013.01); *G07F 17/34* (2013.01)

(58) Field of Classification Search
CPC ............. G07F 17/3211; G07F 17/3213; G07F 17/326; G07F 17/3265
USPC ............................................................ 463/20
See application file for complete search history.

(56) References Cited

U.S. PATENT DOCUMENTS

| | | | | |
|---|---|---|---|---|
| 7,070,502 | B1 | 7/2006 | Bussick et al. | |
| 7,175,523 | B2 | 2/2007 | Gilmore et al. | |
| 7,195,559 | B2 | 3/2007 | Gilmore et al. | |
| 8,021,226 | B2 | 9/2011 | Souza et al. | |
| 8,366,533 | B1 * | 2/2013 | Nicely | G07F 17/3244 463/16 |
| 8,734,223 | B2 | 5/2014 | Zoble et al. | |
| 2006/0205469 | A1 | 9/2006 | Schultz et al. | |
| 2006/0264254 | A1 * | 11/2006 | Aoki | G07F 17/3267 463/20 |
| 2010/0004048 | A1 * | 1/2010 | Brito | G07F 17/3265 463/20 |
| 2012/0034969 | A1 | 2/2012 | Singer et al. | |
| 2013/0184050 | A1 * | 7/2013 | Zoble | G07F 17/3213 463/20 |
| 2013/0190066 | A1 | 7/2013 | Saunders | |
| 2013/0260863 | A1 | 10/2013 | Lee et al. | |

* cited by examiner

*Primary Examiner* — James S McClellan

(57) ABSTRACT

Embodiments of the present invention set forth systems, apparatuses and methods for implementation of multi-reel symbols from prior game results on gaming devices. Accordingly, a gaming device can be configured to receive a first game initiation signal and spin reels on the display to show a first game outcome. The gaming device then determines if the results of the first game outcome are associated with a multi-reel symbol trigger condition. When it is determined that the trigger condition is satisfied, a multi-reel symbol is formed from symbols associated with the triggering condition by locking the symbols together. When the game device receives a second game initiation signal, it determines a second game outcome using the locked multi-reel symbol and then displays the determined second game outcome.

20 Claims, 13 Drawing Sheets

GAMING DEVICE IMPLEMENTING MULTI-REEL SYMBOLS FROM PRIOR GAME RESULTS

RELATED APPLICATIONS

This application claims the benefit of Provisional Patent Application No. 61/917,379, filed on Dec. 18, 2013, to which priority is claimed pursuant to 35 U.S.C. §119(e) and which is incorporated herein by reference in its entirety.

FIELD OF THE INVENTION

This disclosure relates generally to games, and more particularly to systems, apparatuses and methods for implementing multi-reel symbols from prior game results on gaming devices.

BACKGROUND

Casino games such as poker, slots, and craps have long been enjoyed as a means of entertainment. Almost any game of chance that can be played using traditional apparatus (e.g., cards, dice) can be simulated on a computer. The popularity of casino gambling with wagering continues to increase, as does recreational gambling such as non-wagering computer game gambling. It is also likely that most new games will be implemented, at least in part, using computerized apparatus.

One reason that casino games are widely implemented on computerized apparatus is that computerized games are highly adaptable, easily configurable and re-configurable, and require minimal supervision to operate. For example, the graphics and sounds included in such games can be easily modified to reflect popular subjects, such as movies and television shows.

Computer gaming devices can also be easily adapted to provide entirely new games of chance that might be difficult to implement using mechanical or discrete electronic circuits. Because of the ubiquity of computerized gaming machines, players have come to expect the availability of an ever wider selection of new games when visiting casinos and other gaming venues. Playing new games adds to the excitement of "gaming." As is well known in the art and as used herein, the term "gaming" and "gaming devices" generally involves some form of wagering, and that players make wagers of value, whether actual currency or something else of value, e.g., token or credit. Wagering-type games usually provide rewards based on random chance as opposed to skill In some jurisdictions, the absence of skill when determining awards during game play is a requirement.

The present disclosure describes methods, systems, and apparatus that provide for new and interesting gaming experiences, and that provide other advantages over the prior art.

SUMMARY

To overcome limitations in the prior art described above, and to overcome other limitations that will become apparent upon reading and understanding the present specification, embodiments of the present invention are directed to an apparatus, system, computer readable storage media, and/or method that involve or otherwise facilitate implementation of multi-reel symbols from prior game results on gaming devices. Accordingly, a gaming device can be configured to receive a first game initiation signal and spin reels on the display to show a first game outcome. The gaming device then determines if the results of the first game outcome are associated with a multi-reel symbol trigger condition. When it is determined that the trigger condition is satisfied, a multi-reel symbol is formed from symbols associated with the triggering condition by locking the symbols together. When the game device receives a second game initiation signal, it determines a second game outcome using the locked multi-reel symbol and then displays the determined second game outcome.

In one embodiment, a gaming device includes a display, a player interface, and a processor. The processor may be configured to receive a first game initiation signal and spin reels on the display to show a first game outcome. The processor may further be configured to determine if the results of the first game outcome is associated with a multi-reel symbol trigger condition. When it is determined that the trigger condition is satisfied, the processor is further configured to form a multi-reel symbol from symbols associated with the triggering condition and lock the reels associated with the multi-reel symbol together. The processor is further configured to receive a second game initiation signal and spin reels, including the one or more locked reels, on the display to show a second game outcome. The processor may then be configured to determine prizes associated with the game outcome.

DETAILED DESCRIPTION

Figure 1:
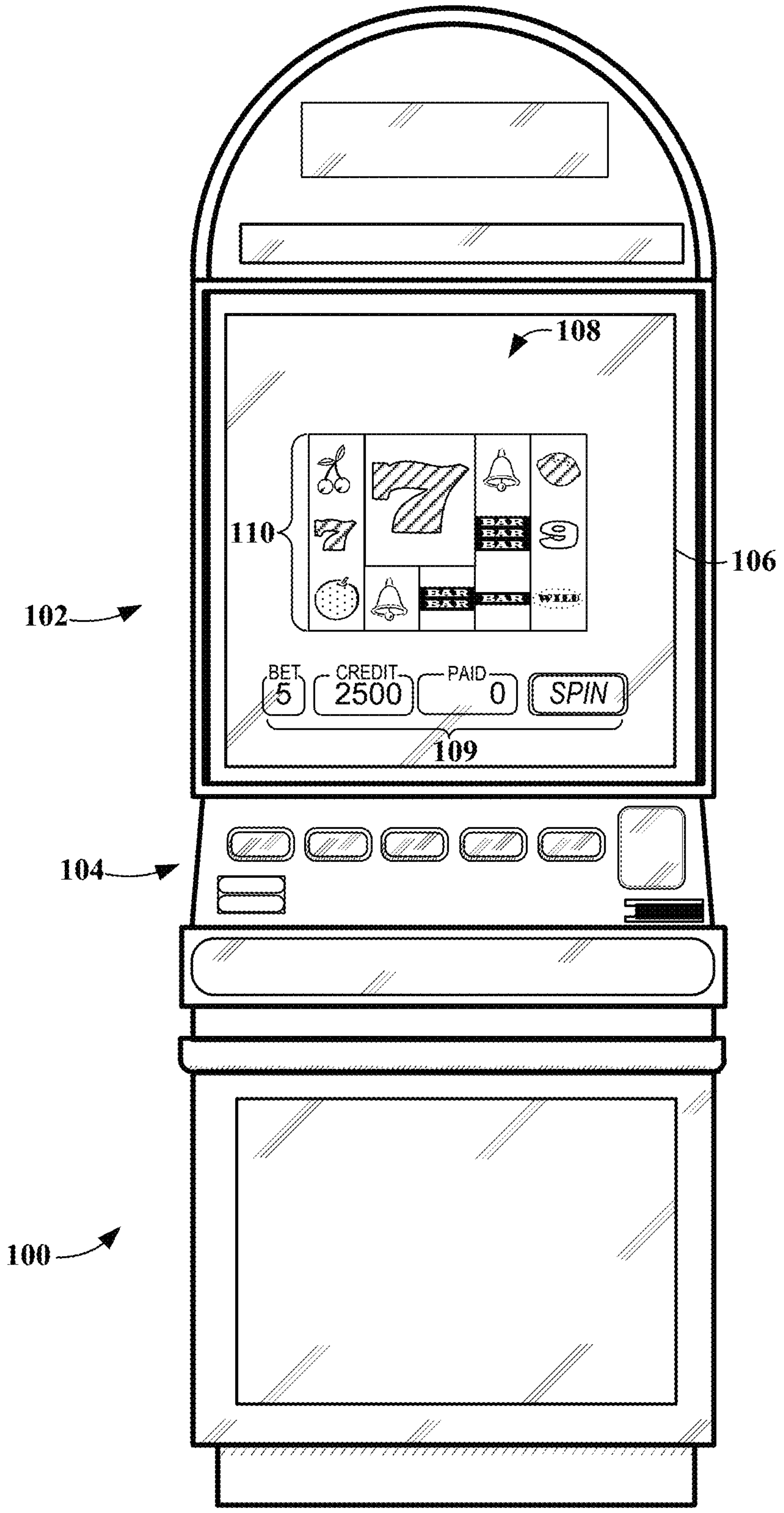
FIG. 1 is a diagram of a gaming machine according to embodiments of the invention.

In the following description of various exemplary embodiments, reference is made to the accompanying drawings which form a part hereof, and in which is shown by way of illustration representative embodiments in which the features described herein may be practiced. It is to be understood that other embodiments may be utilized, as structural and operational changes may be made without departing from the scope of the disclosure.

In the description that follows, the term “reels,” “cards,” “decks,” and similar mechanically descriptive language may be used to describe various apparatus presentation features, as well as various actions occurring to those object (e.g., “spin,” “draw,” “hold,” “bet”). Although the present disclosure may be applicable to both to manual, mechanical, and computerized embodiments, and any combination therebetween, the use of mechanically descriptive terms is not meant to be only applicable to mechanical embodiments. Those skilled in the art will understand that, for purposes of providing gaming experiences to players, mechanical elements such as cards, reels, and the like may be simulated on a display in order to provide a familiar and satisfying experience that emulates the behavior of mechanical objects, as well as emulating actions that occur in the non-computerized games (e.g., spinning, holding, drawing, betting). Further, the computerized version may provide the look of mechanical equivalents but may be generally randomized in a different way. Thus, the terms “cards,” “decks,” “reels,” “hands,” etc., are intended to describe both physical objects and emulation or simulations of those objects and their behaviors using electronic apparatus.

In various embodiments of the invention, the gaming displays are described in conjunction with the use of data in the form of “symbols.” In the context of this disclosure, a “symbol” may generally refer at least to a collection of one or more arbitrary indicia or signs that have some conventional significance. In particular, the symbol represents values that can at least be used to determine whether to award a payout. A symbol may include numbers, letters, shapes, pictures, textures, colors, sounds, etc., and any combination therebetween. A win can be determined by comparing the symbol with another symbol. Generally, such comparisons can be performed via software by mapping numbers (or other data structures such as character strings) to the symbols and performing the comparisons on the numbers/data structures. Other conventions associated with known games (e.g., the numerical value/ordering of face cards and aces in card games) may also be programmatically analyzed to determine winning combinations.

As used in this disclosure, the term “multi-reel symbol” may be used to describe a symbol that spans two or more game reels. The terms “multi-symbol reel” and “block symbol” may also be used interchangeably in this description. For example, in a traditional video slot game with five vertical reels that spin, a two-reel block symbol would be a symbol that was partially on both of reels 1 and 2, reels 2 and 3, reels 3 and 4, or reels 4 and 5 (although possible embodiments could also include a block symbol that wrapped around from reel 5 to reel 1). Other multi-reel symbols may be three-reel, four-reel, five-reel, etc. block symbols that span more than two reels. In yet other variations, the reels associated with a block symbol need not be adjacent. For instance, in a 5 reel game, reels 1, 3, and 5 may be associated with a single block symbol. In these cases a block symbol may contain a gap or gaps.

For evaluation purposes, each position of a block symbol may be treated as an independent symbol of a similar type to the symbol shown on the block symbol, in some embodiments. For example, in a 2×2 block symbol that shows a wild symbol, the four symbol positions associated with the block symbol may each be evaluated as a separate wild symbol. In other embodiments, a block symbol may be evaluated as being a single symbol. In yet other embodiments, a block symbol may have a special evaluation process, such as by acting as a multiplier bonus credit trigger, or other outcome modifier.

Generally, systems, apparatuses and methods are described for enhancing winning result opportunities in gaming activities. The systems, apparatuses and methods described herein may be implemented as a single game, or part of a multi-part game. For example, the game features described herein may be implemented in primary gaming activities, bonus games, side bet games or other secondary games associated with a primary gaming activity. The game features may be implemented in stand-alone games, multi-player games, etc. Further, the disclosure may be applied to games of chance, and descriptions provided in the context of any representative game (e.g. slot machine game) are provided for purposes of facilitating an understanding of the features described herein. However, the principles described herein are equally applicable to any game of chance where an outcome(s) is determined for use in the player’s gaming activity. The game features described herein may be employed in stand-alone games, a primary/base games, bonus games, side bet games, etc.

Embodiments of the present concept include providing gaming devices (also referred to as gaming apparatuses or gaming machines), gaming systems, and methods of operating these devices or systems to provide game play that implements multi-reel symbols in a gaming device based on prior game outcomes. In one embodiment, a method of operating a gaming device includes a process of transforming a prior game outcome into a game play grid having one or more multi-reel symbols spanning one or more independent reels. That is, independent reels may be associated together to facilitate a block symbol connected to each of the reels. In game play, these associated reels may be spun individually during some of the game play, or may be connected or locked to each other in order to facilitate the block symbol appearing in relation with the two or more reels. One method of accomplishing this is to form a block symbol from a prior game result and then lock the reels associated with the block symbol together prior to game play in a subsequent game. Although the block symbol may not appear in the final game result of the subsequent game when the reels are stopped, evidence or animation of the block symbol may be seen during the spinning of the reels. In other embodiments, the symbols from the prior game result may be locked or fused together, but the associated reels may still spin independently of each other with the block symbol either anchored to one reel or independently positioned over the associated reels.

In an example that uses the above process, the outcome of a first game may include a string of identical symbols on reels 2 and 3. After awarding prizes for the first game, these strings of identical symbols may be transformed into a block symbol that spans portions of reels 2 and 3. Reels 2 and 3 may then be locked together. When another wager is received for a subsequent game, the reels are spun with locked reels 2 and 3 spinning together.

Numerous variations are possible using these and other embodiments of the inventive concept. Some of these embodiments and variations are discussed below with reference to the drawings. However, many other embodiments and variations exist that are covered by the principles and scope of this concept. For example, although some of the embodiments discussed below involve reel-based slot machine examples of this concept, other embodiments include application of similar techniques in other types of poker games, slot games, or other games of chance. Some of these other types of embodiments will be discussed below as variations to the examples illustrated. However, many other types of games can implement similar techniques and fall within the scope of this inventive concept.

Referring to the example gaming apparatus 100 shown in FIG. 1, the gaming apparatus includes a display portion 102 (also referred to as a gaming display), and a player interface portion 104, although some or all of the user interface 104 may be provided via the display 102 in touch screen embodiments. The display portion 102 may include one or more display areas 106 that may be included in physically separate displays or as portions of a common large display. Here, the game display 106 includes a game play portion 108 that displays game elements and symbols 110, and an operations portion 109 that can include meters, various game buttons, or other game information for a player of the gaming device 100.

The user interface 104 allows the user to control and engage in play of the gaming machine 100. The particular user interface mechanisms included with user interface 104 may be dependent on the type of gaming device. For example, the user interface 104 may include one or more buttons, switches, joysticks, levers, pull-down handles, trackballs, voice-activated input, or any other user input system or mechanism that allows the user to play the particular gaming activity.

The user interface 104 may allow the user or player to enter coins, bills, or otherwise obtain credits through vouchers, tokens, credit cards, tickets, etc. Various mechanisms for entering such vouchers, tokens, credit cards, coins, tickets, etc. are known in the art. For example, coin/symbol input mechanisms, card readers, credit card readers, smart card readers, punch card readers, radio frequency identifier (RFID) readers, and other mechanisms may be used to enter wagers. It is through the user interface 104 that the player can initiate and engage in gaming activities. While the illustrated embodiment depicts various buttons for the user interface 104, it should be recognized that a wide variety of user interface options are available for use in connection with the present invention, including pressing buttons, touching a segment of a touch-screen, entering text, entering voice commands, or other known data entry methodology.

The display device 102 may include one or more of an electronic display, a mechanical display, and a fixed display information, such as paytable information associated with a glass/plastic panel on the gaming machine 100. The symbols or other indicia associated with the play of the game may be presented on an electronic display device or on mechanical devices associated with a mechanical display. Generally, the display 102 devotes the largest portion of viewable area to the primary gaming portion 106. The gaming portion 106 is generally where the visual feedback for any selected game is provided to the user. The gaming portion 106 may render graphical objects such as cards, slot reels, dice, animated characters, and any other gaming visual known in the art. The gaming portion 106 also typically informs players of the outcome of any particular event, including whether the event resulted in a win or loss.

In some of the example embodiments illustrated herein, the gaming portion 106 may display a grid 108 (or equivalent arrangement) of reel stop positions. The grid 108 may also be associated with paylines that pass through multiple reel stop positions in the grid to define position combinations associated with awards.

In the illustrated grid 108, five reels are shown with three reel stop positions visible for each reel. Hence, in this embodiment the grid 108 is a 5×3 grid (i.e., five symbols wide by 3 symbols high). Although, the grid 108 is shown on a video display 102 in this embodiment, the grid could also be implemented on a display that included physical reels that mechanically spin.

The gaming portion 106 may include other features known in the art that facilitate gaming, such as status and control portion 109. As is generally known in the art, this portion 109 provides information about current bets, current wins, remaining credits, etc. associated with gaming activities of the grid 108. The control portion 109 may also provide touchscreen controls for facilitating game play. The grid 108 may also include touchscreen features, such as facilitating spinning of the reels, stopping of the reels, or wager placement. The gaming portion 106 of the display 102 may include other features that are not shown, such as paytables, navigation controls, etc.

Figure 2A:
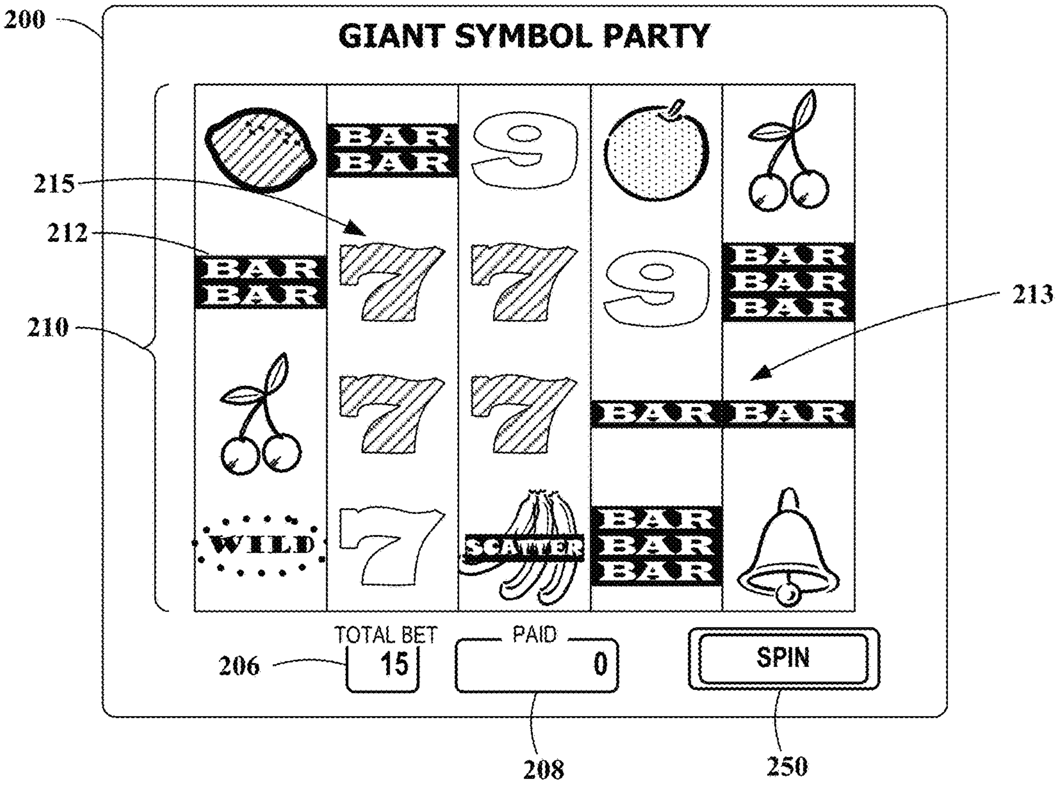
FIGS. 2A and 2B are detail diagrams of a game display showing the formation of multi-reels symbols for use in a subsequent game according to embodiments of the invention.
Figure 2B:
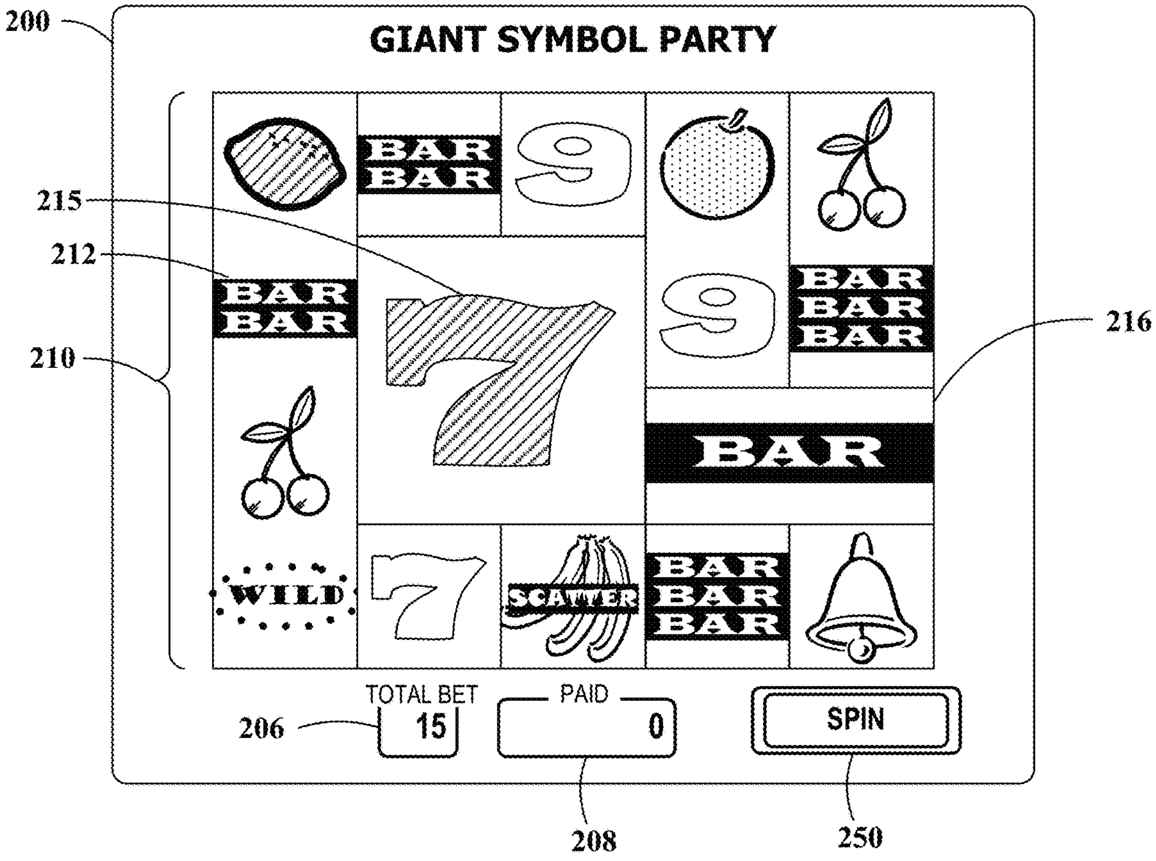

FIGS. 2A and 2B are detail diagrams of a game display showing the formation of multi-reels symbols for use in a subsequent game according to embodiments of the invention. Referring to FIG. 2A, a game display 200 is shown having a 5×4 gaming grid 210 along with game meters 206, 208 and a player interface button 250. The gaming grid 210 includes five independent reels that each have four reel stop positions visible as part of a game outcome. Game symbols 212 populate the reel and form the reel strips associated with each reel in the game device. Although five continuous reels are shown in this embodiment, each reel stop position may have its own independent reel strip associated with it in other embodiments.

In FIG. 2A, the outcome of a first gaming event is shown on the game grid 210 of the game display 200. This outcome includes a group of shaded-7 symbols 215 positioned adjacent to each other on reels 2 and 3, as well as two single-bar symbols 216 positioned adjacent to each other on reels 4 and 5. After this outcome is received, the adjacent, identical symbols are locked or fused together to form block symbols, and the corresponding reels may be locked.

Referring to FIG. 2B, the game grid 210 of the game display 200 now illustrates two multi-reel symbols 217, 218. Block symbol 217 is a 2×2 symbol that spans reels 2 and 3. Block symbol 218 is a 1×2 symbol that spans reels 4 and 5. As discussed above, block symbols may be of any size that fit within the game reels. In some embodiments, the presence of the block symbol 217 on reels 2 and 3 causes reels 2 and 3 to be locked together. Likewise, the presence of the block symbol 218 on reels 4 and 5 would mean that reels 4 and 5 are also locked together. Thus, during a reel spin in a subsequently played gaming event, reel 1 would spin independently, reels 2 and 3 would spin and stop together, and reels 4 and 5 would spin and stop together.

In other embodiments, reels 2, 3, 4, and 5 may remain independent of each other. In these embodiments, the outcome of, for example, reel 2 would not influence the selected outcome for reel 3. The block symbol may be tied or anchored to one or more symbol position on one of the associated reels or may have a relative position to the reels determined independently of the stopping position determined for the reels. Here, for example, the shaded-7 block symbol 217 may be anchored by the two symbol positions associated with the shaded-7 symbols 215 on reel 2. During the next game, reels 2 and 3 may be spun independently with a stopping position independently determined for each reel. The block symbol 217 may replace any adjacent symbol on reel 3, or may displace the adjacent two symbols on the third reel downward. In one example, the two shaded-7 symbols 215 on reel 3 that are part of the formed block symbol 217 may be removed from reel 3 during the subsequent game when the reels are spun and then inserted into positions in reel 3 that are adjacent to the block-anchoring symbols on reel 2.

Although FIGS. 2A and 2B show that only identical symbols are grouped into block or multi-reel symbols, other embodiments may include blocking or grouping other non-identical symbols into block symbols. For example, if one of the shaded-7 symbols 215 in FIG. 2A was another symbol, a rule may indicate that if three out of four symbols in a 2×2 area match, that the entire 2×2 area is converted or transformed into a block symbol. As discussed below, various other rules may be applied to form multi-reel symbols for use in a second game where non-identical symbols are present in a first game outcome.

In some embodiments, a game may require a minimum number of identical symbols (or other triggering symbols) in a particular pattern to form a multi-reel or block symbol. For example, in some embodiments, a rule states that the minimum size for a block symbol is 2×2. Hence, receiving the two single-bar symbols 213 adjacent to each other on reels 4 and 5 in FIG. 2A would not result in the formation of a block symbol across reels 4 and 5.

FIGS. 3A-3D, 4A-4D, and 5A-5D illustrate various game play progressions showing example embodiments of forming multi-reel symbols. Aspects of these various embodiments may be combined or removed in other embodiments. Additionally, other block formation embodiments are possible and contemplated as described above.

Figure 3A:
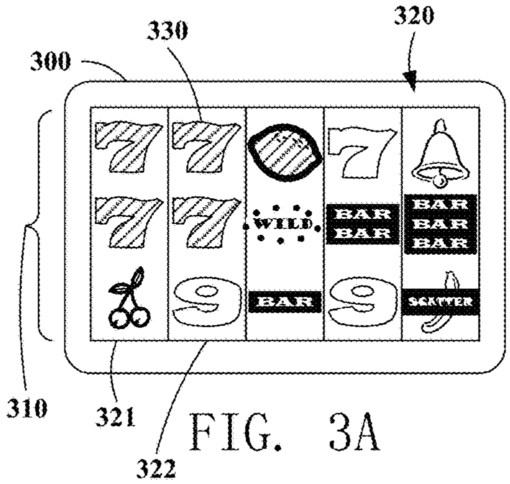
FIGS. 3A, 3B, 3C, and 3D are diagrams of a game display showing a progression of game play with a multi-reel symbol according to embodiments of the invention.
Figure 3B:
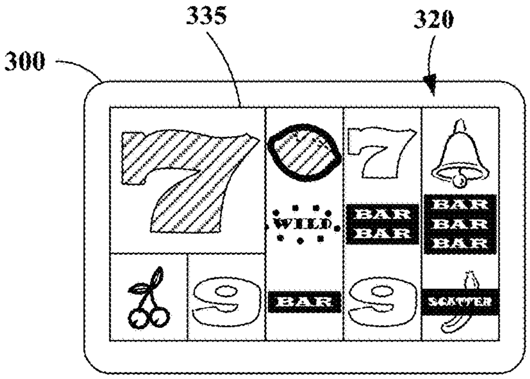
Figure 3C:
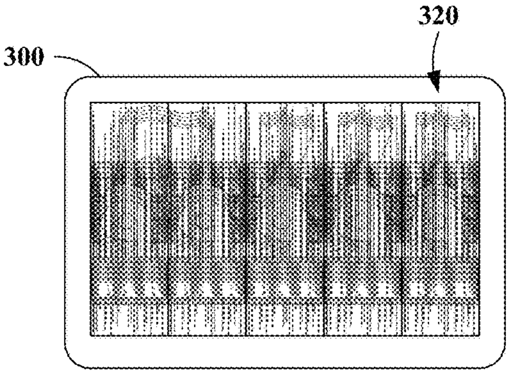
Figure 3D:
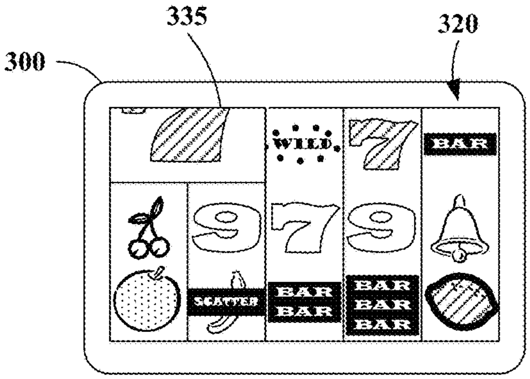
Figures 4A, 4B, 4C, 4D:
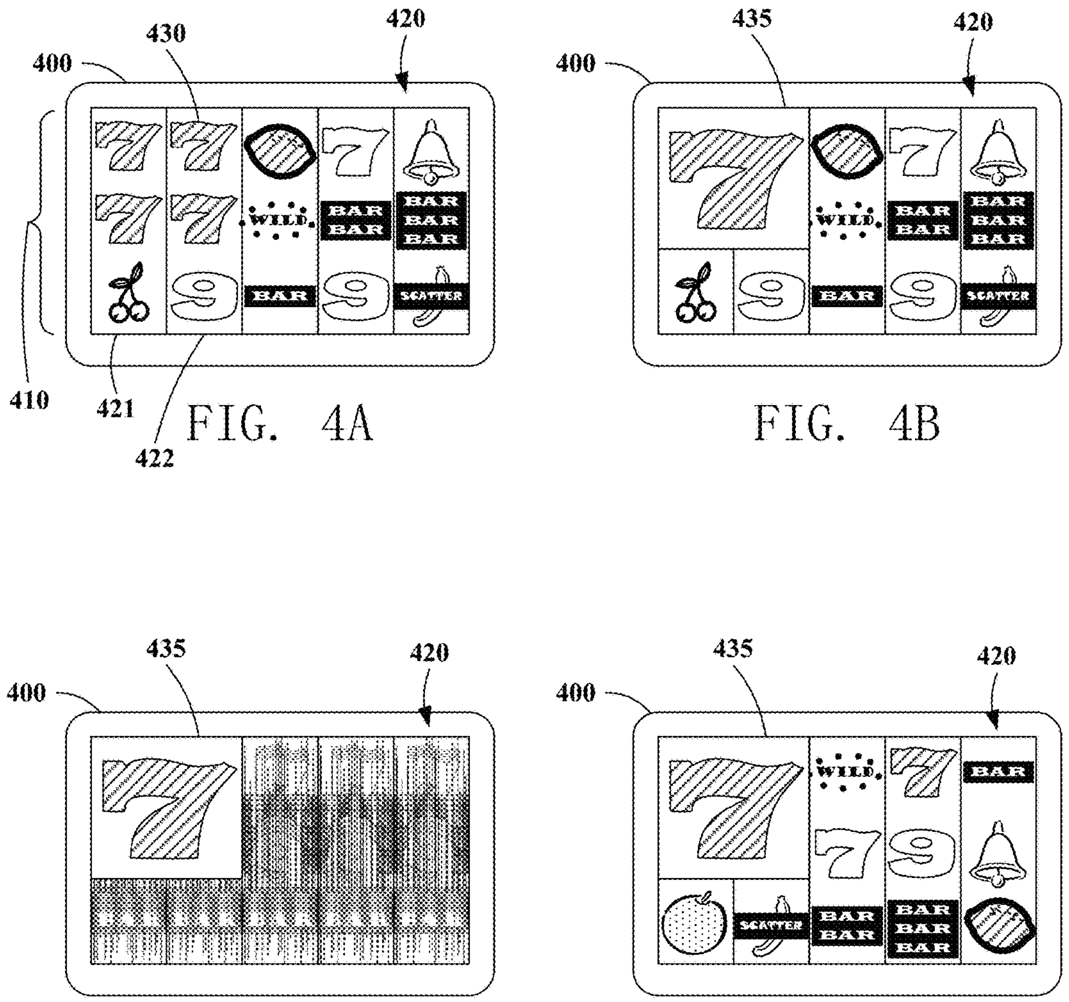
FIGS. 4A, 4B, 4C, and 4D are diagrams of a game display showing another progression of game play with a multi-reel symbol according to embodiments of the invention.

FIGS. 3A, 3B, 3C, and 3D are diagrams of a game display 300 showing a progression of game play on a game grid 310 having multiple game reels 320 with a multi-reel symbol 335 according to embodiments of the invention. Referring to FIG. 3A a first game outcome is shown where a group of shaded-7 symbols 330 appear in a 2×2 area on reels 1 and 2 321, 322. In FIG. 3B, these shaded-7 symbols 330 are formed into a single block symbol 335 that spans portions of reels 1 and 2 321, 322. Reels 1 and 2 321, 322 are then locked together. After another wager is placed or a second game is otherwise initiated, the reels 320 are spun again, as shown in FIG. 3C. In this embodiment, reels 1 and 2 321, 322 are locked together; hence reels 1 and 2 spin together in synch. In FIG. 3D, the reels 320 come to a rest to show the game outcome of the second game.

FIGS. 4A, 4B, 4C, and 4D are diagrams of a game display 400 showing another progression of game play on a game grid 410 having multiple game reels 420 with a multi-reel symbol 435 according to embodiments of the invention. The progression in FIGS. 4A-4D shows a similar progression to FIGS. 3A-3D, where a group of symbols 430 appearing in the outcome of a first game or gaming event are locked or fused together to form a multi-reel symbol 435. However, in the embodiments shown in FIGS. 4A-4D, after a block symbol 435 is formed, the block 435 is locked into place on the game grid 410 and the reels 420 are spun independently, as shown by the reels spinning underneath the block symbol in FIG. 4C. In these embodiments, reels 1 and 2 421, 422 may not necessarily be locked together since they are being spun independently from the block symbol 435. The symbols on reels 1 and 2 421, 422 that would be covered by the locked block symbol may be replaced by the block symbol 435, or may be displaced downward or upward relative to the positions occupied by the locked block symbol.

Figure 5A:
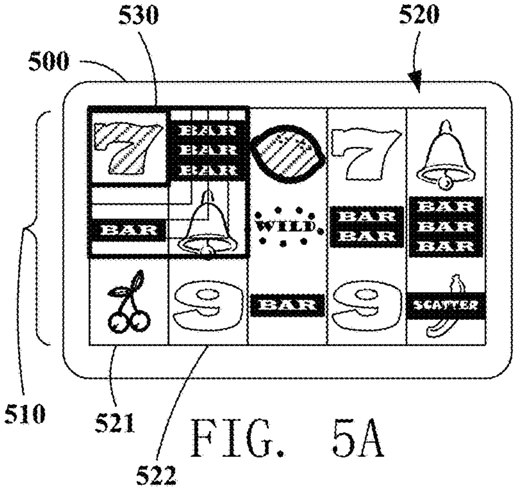
FIGS. 5A, 5B, 5C, and 5D are diagrams of a game display showing another progression of game play with a multi-reel symbol according to embodiments of the invention.
Figure 5B:
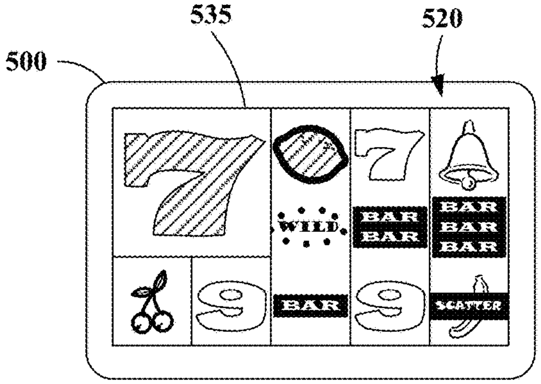
Figure 5C:
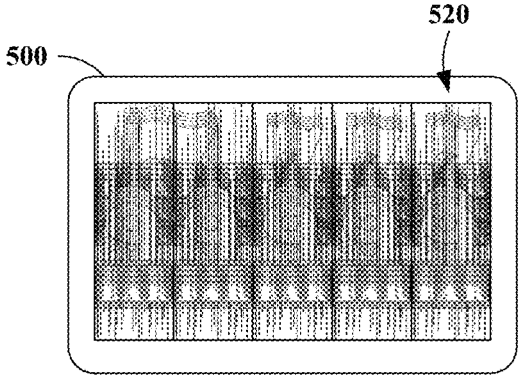
Figure 5D:
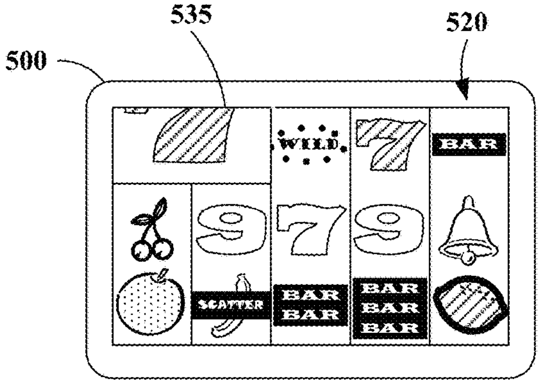

FIGS. 5A, 5B, 5C, and 5D are diagrams of a game display 500 showing another progression of game play on a game grid 510 having multiple game reels 520 with a multi-reel symbol 535 according to embodiments of the invention. The progression shown in FIGS. 5A-5D shows a similar embodiment to FIGS. 3A-3D, where a group of symbols 530 appearing in the outcome of a first game or gaming event are locked or fused together to form a multi-reel symbol 535. However in the progression shown in FIGS. 5A-5D, a single triggering symbol 530 in the game outcome of a first game causes the formation of a block symbol 535 for use in the subsequently played second game. As shown in FIG. 5A, a single shaded-7 symbol 530 on reel 1 521 triggers a block formation of a 2×2 block symbol that spans portions of reels 1 and 2 521, 522. Here, the triggering may be done by random selection, may be determined by a special symbol landing in a predefined game grid position, may be associated with a characteristic of the symbol (which may, for example, be indicated by a subsymbol), may be triggered by a mystery bonus, or may be triggered by any other triggering event known in the art.

In some embodiments, reels 1 and 2 521, 522 may remain independent of each other and spun separately in the second gaming event. Here, the position of the triggering symbol 530 may act as an anchor symbol where the block is reformed prior to displaying the final game outcome of the second gaming event based on the final position of the anchor symbol. This anchor symbol process may also be used when blocks are formed by grouping similar symbols in a first game outcome as discussed above. In other embodiments, reels 1 and 2 521, 522 may be locked together with the formation of the block symbol 535, and spun together in the second gaming event. The symbols on reels 1 and 2 521, 522 that become covered by the formation and expansion of the block symbol 535 may be replaced by the block symbol formation, may be displaced upward or downward on the reel due to the block symbol formation, or may cause the associated symbol positions to reflect properties of both the block symbol and the underlying symbol, such as by creating sub-symbols, split symbols, or otherwise incorporating properties of both symbols in each affected symbol position.

In yet other embodiments, sub-symbols may be associated with some symbols on the reel strips. These sub-symbols may be randomly assigned to various symbol positions, or they may be predefined in the reel strips of the game. Here, block symbols may be formed when two or more symbols having matching sub-symbols appear on adjacent or otherwise related game reels. The primary symbols of these symbol positions may be combined into a multi-symbol block symbol or one of the primary symbols may be selected, randomly or based on the symbol-type, as the symbol for the block symbol. Alternatively, the block symbol may be assigned a special symbol value or outcome modifier, such as a wild symbol, a bonus symbol, or a multiplier.

Figure 6A:
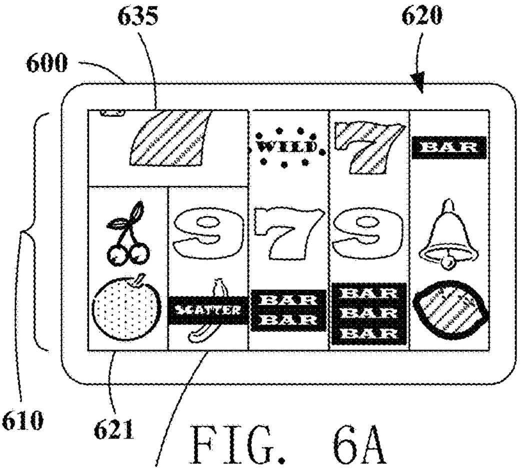
FIGS. 6A and 6B are diagrams of a game display showing an example multi-reel symbol feature implementation according to embodiments of the invention.
Figure 6B:
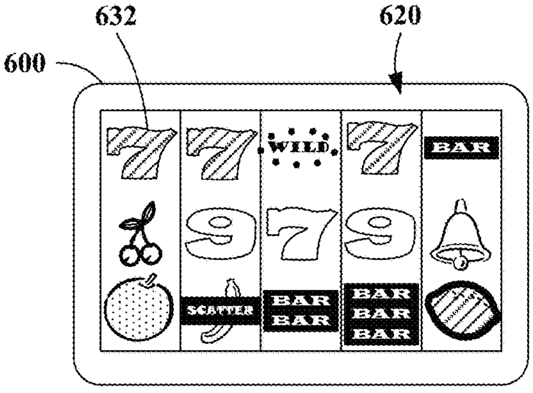
Figure 7A:
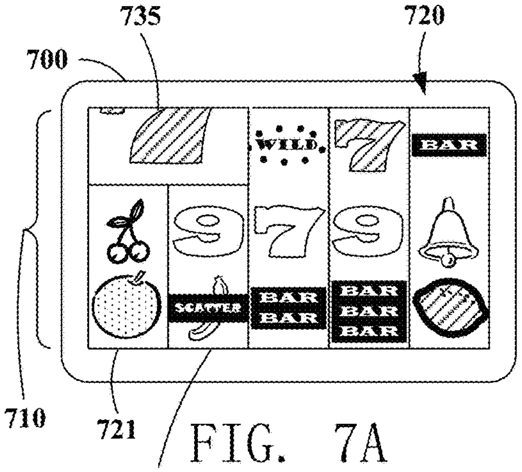
FIGS. 7A and 7B are diagrams of a game display showing another example multi-reel symbol feature implementation according to embodiments of the invention.
Figure 7B:
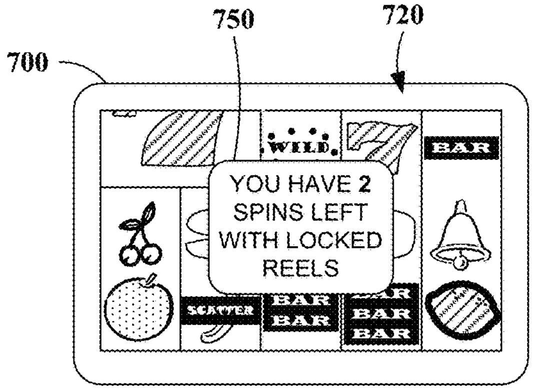

FIGS. 6A-6B and 7A-7B show various embodiments of what happens to block symbols after they are used in a second or subsequent game. That is, these illustrated game progressions show some of the methods for eliminating block symbols from the game reels. For instance, FIG. 6A illustrates a game display 600 having a game grid 610 showing multiple game reels 620 after a gaming event, which is similar to what the result of the second gaming event outcome appears in FIGS. 3D and 5D with the presence of a block symbol 635. In the embodiment shown in FIG. 6B, after the second gaming event, the block symbol 635 that appears on reels 1 and 2 621, 622 may revert back to separated single-position symbols 632 for the next gaming event. That is, the block formation only lasts for a single subsequent gaming event. In other embodiments, the block symbol 635 may remain as a block as long as some portion of it remains on the game grid 610 during a game outcome for the second gaming event. In yet other embodiments, the block symbol 635 may last for a predetermined time, a predetermined number of spins (such as shown in FIG. 7B using similar element designators and message box 750), until a winning outcome is received, until a winning outcome is not received, until a portion of the block symbol is not shown on the game play grid, until no portion of the block symbol is shown on the game play grid, or other block-breaking criterion is satisfied.

Figure 8A:
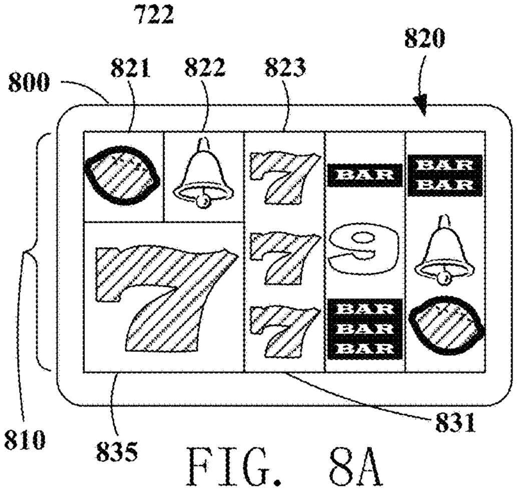
FIGS. 8A and 8B are diagrams of a game display showing another example multi-reel symbol feature implementation according to embodiments of the invention.
Figure 8B:
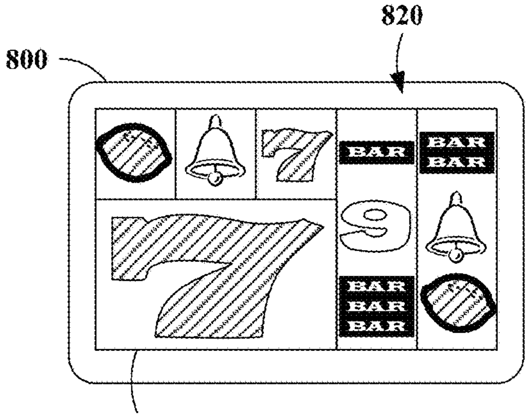

In some embodiments, such as shown by FIGS. 8A and 8B, a block symbol 835 can be grown or expanded by having additional identical symbols 831 (or another triggering or retriggering conditions being present) adjacent to the block symbol. In the embodiment shown in FIGS. 8A and 8B, a game display 800 having a game grid 810 showing multiple game reels 820 after a gaming event results in additional shaded-7 symbols 831 being positioned next to the shaded-7 block symbol 835 after the second gaming event. These additional adjacent shaded-7 symbols 831 may allow the block 835 to expand into a 3×2 block 836 by covering parts of reels 1, 2, and 3 821, 822, 823. Note that in some embodiments, reels 1, 2, and 3 821, 822, 823 would then be locked together for the subsequent reel spin in a third gaming event. This expanded block symbol 836 may remain locked or fused together until a block breaking criterion of condition is met as described above. In other embodiments, however, a block symbol 836 may be broken down into individual symbols over multiple subsequent games. For example, the block symbol 836 may be divided down to a 2×2 block such as block 835 in a fourth gaming event if the block is not further expanded. The remaining 2×2 block may then be completely divided to individual symbols in the fifth gaming event if it is not expanded in the fourth gaming event. In other words, the block symbol could be systematically increased and decreased in size over multiple game events depending on the presence or absence of triggering conditions.

Figure 9A:
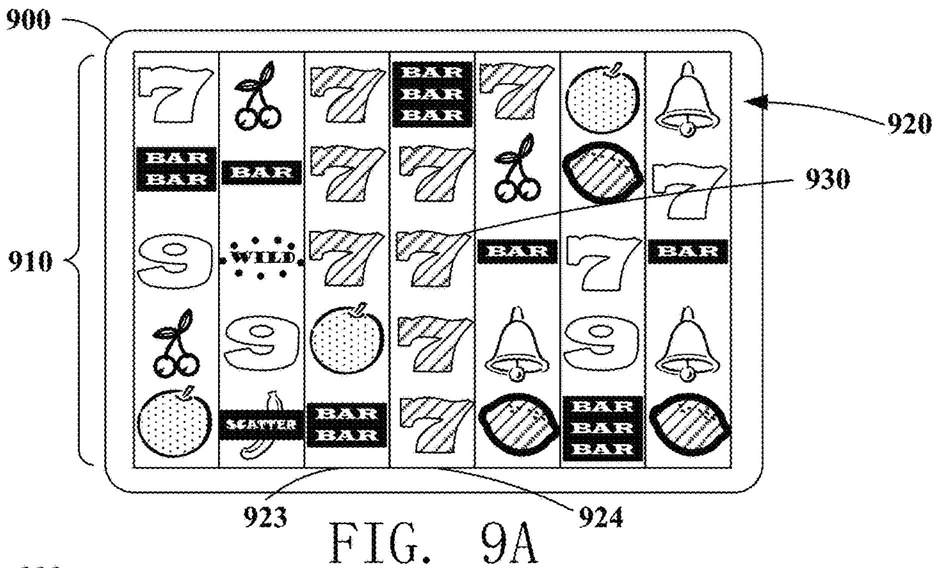
FIGS. 9A, 9B, and 9C are diagrams of a game display showing another example multi-reel symbol feature implementation according to embodiments of the invention.
Figure 9B:
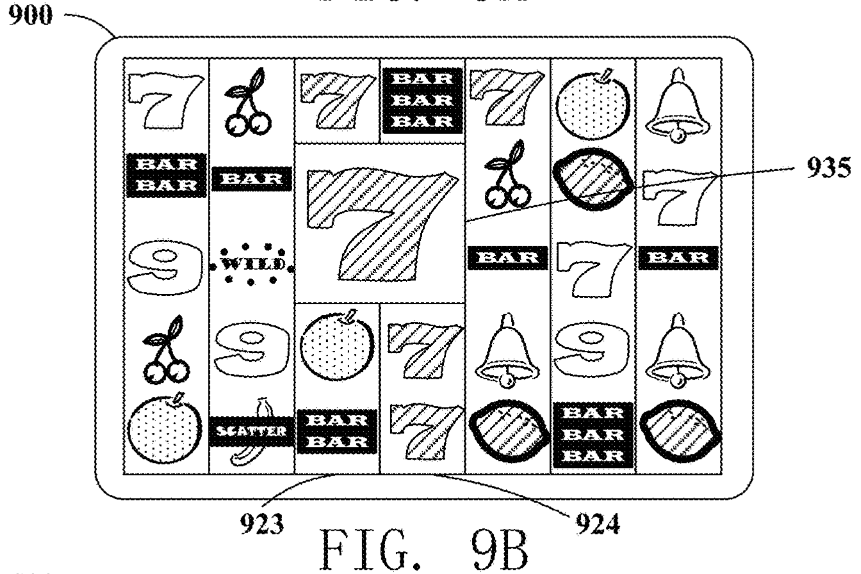
Figure 9C:
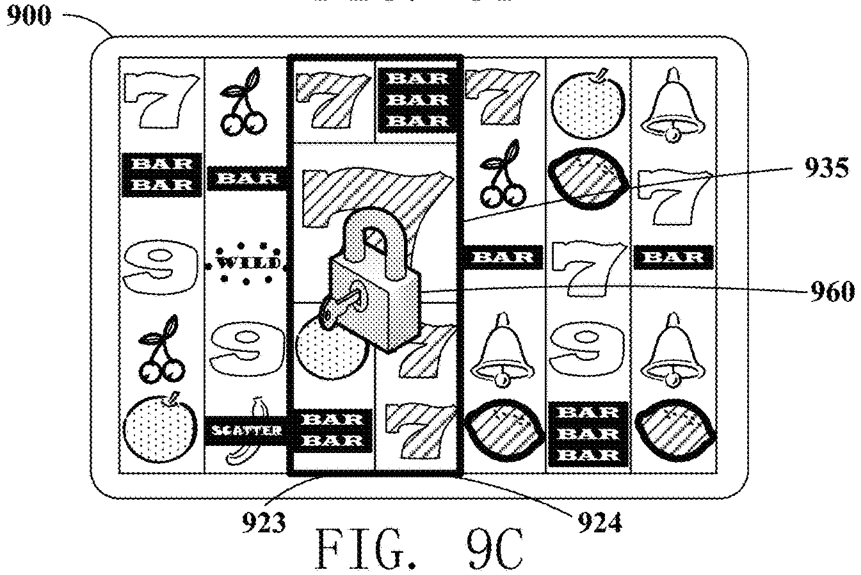

FIGS. 9A, 9B, and 9C are diagrams of a game display 900 showing another example multi-reel symbol feature implementation according to embodiments of the invention. Referring to FIGS. 9A-9C a gaming display 900 with a 7×5 game grid 910 having seven game reels 920 is shown. Larger game grids 910 may allow for increased chances at forming block symbols. Referring to FIG. 9A, the result of a first gaming event on the game display 900 is shown. Here, stacks of shaded-7 symbols 930 appear on reels 3 and 4 923, 924. The overlapping portions of the symbol stacks 930 (i.e., the adjacent portions) are formed into a 2×2 block symbol 935 as shown in FIG. 9B. Reels 3 and 4 923, 924 are then locked as shown by the locking animation 960 in FIG. 9C. After another wager is placed, or a second game is otherwise initiated, the game reels 920 will spin with reels 3 and 4 923, 924 locked together and a block symbol 935 appearing within the locked reels.

Figure 10A:
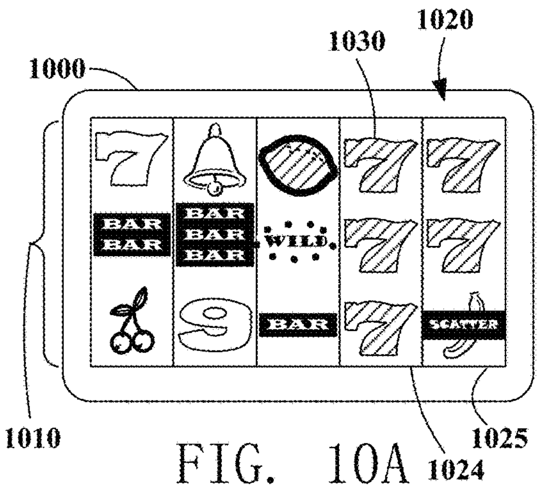
FIGS. 10A and 10B are diagrams of a game display showing another example multi-reel symbol feature implementation according to embodiments of the invention.
Figure 10B:
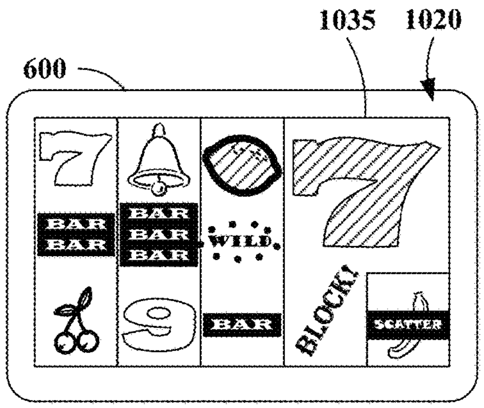

FIGS. 10A and 10B are diagrams of a game display 1000 showing another example multi-reel symbol feature implementation according to embodiments of the invention. Referring to FIGS. 10A and 10B, a gaming display 1000 having a game grid 1010 with multiple game reels 1020 is shown where symbols 1030 that are not adjacent to an identical symbol across reels are still formed as part of a block symbol 1035. That is, as shown in FIG. 10B, the lower shaded-7 symbol on reel 4 1024 is formed as part of the shaded-7 block 1035 on reels 4 and 5 1024, 1025. As discussed above, blocks may even be formed from non-adjacent symbols where the resulting block symbol includes gaps, windows, or spaces, or be formed into other non-symmetric shapes.

Figure 11A:
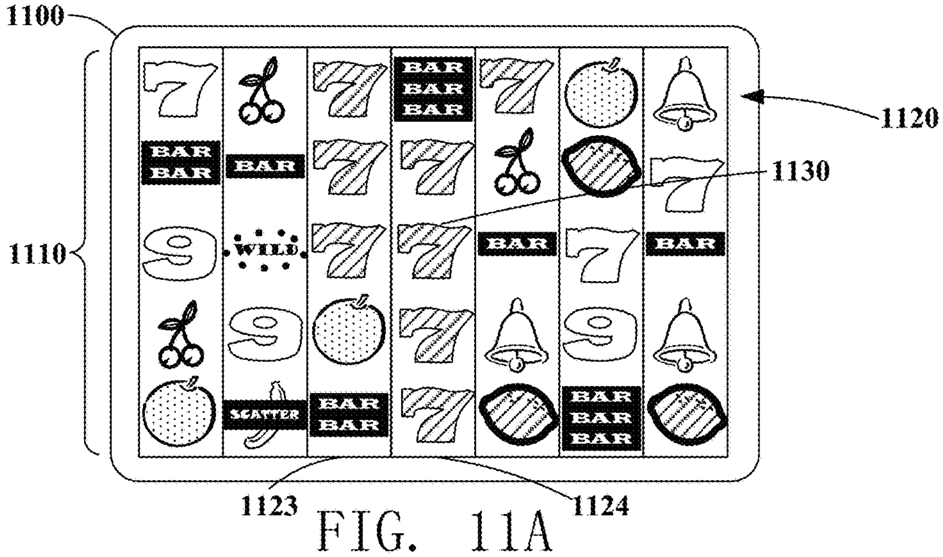
FIGS. 11A, 11B, 11C, 11D, 11E, and 11F are diagrams of a game display showing another progression of game play with a multi-reel symbol according to embodiments of the invention.
Figure 11B:
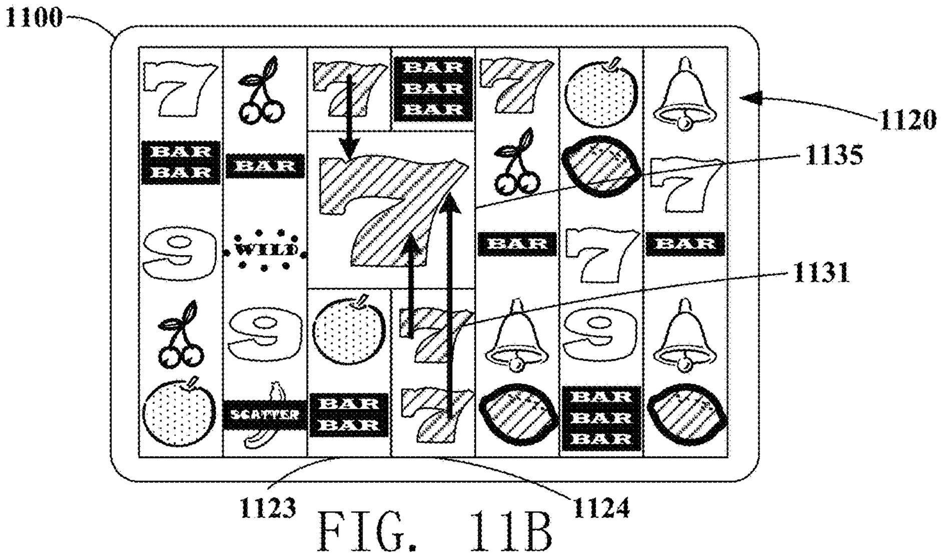
Figure 11C:
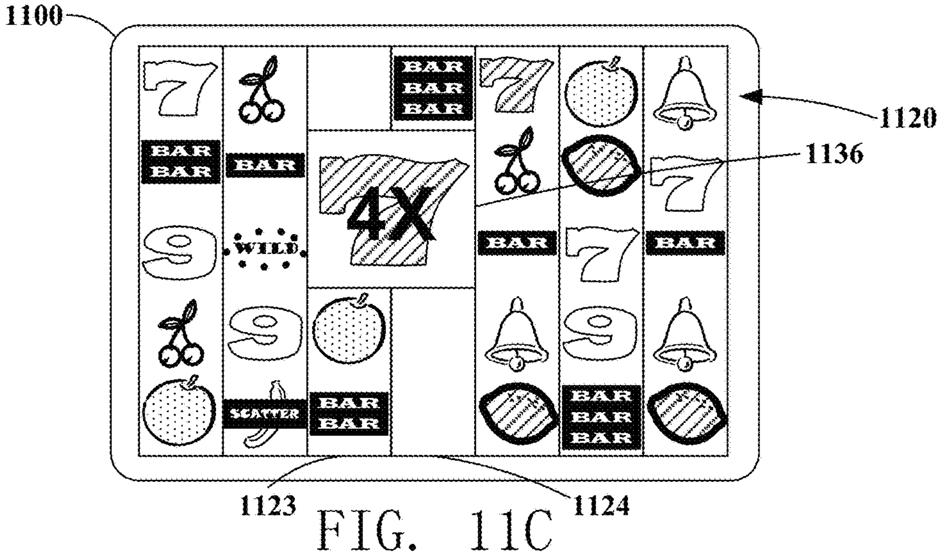
Figure 11D:
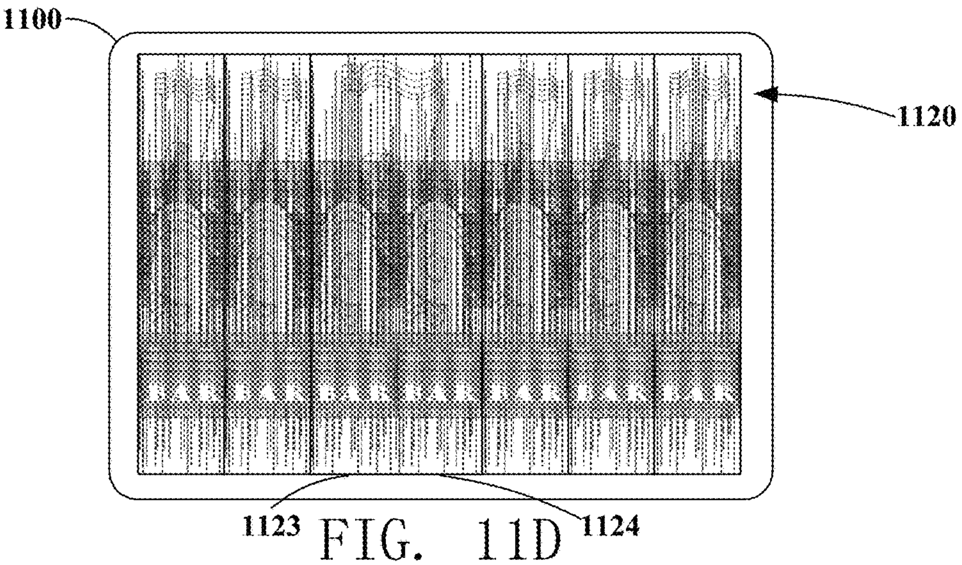
Figure 11E:
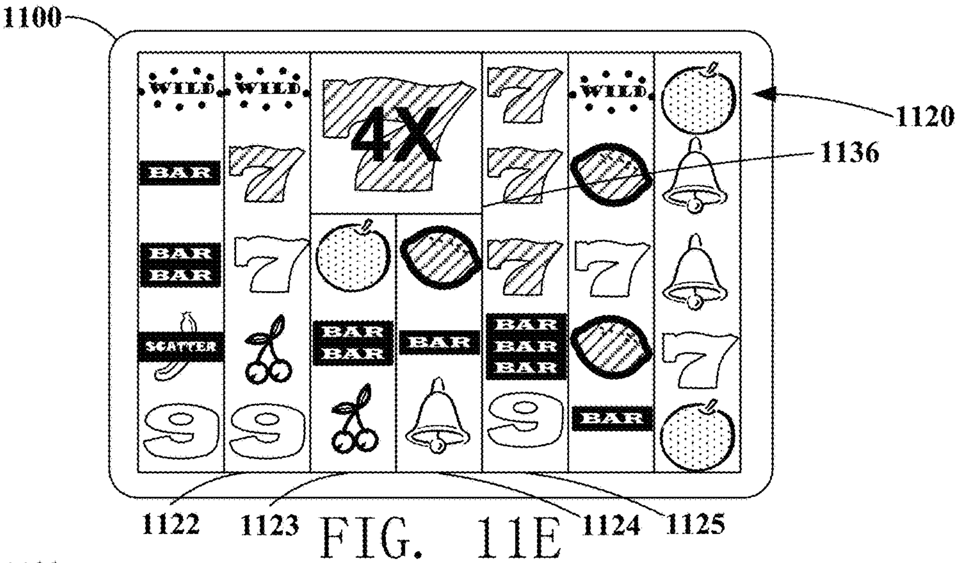
Figure 11F:
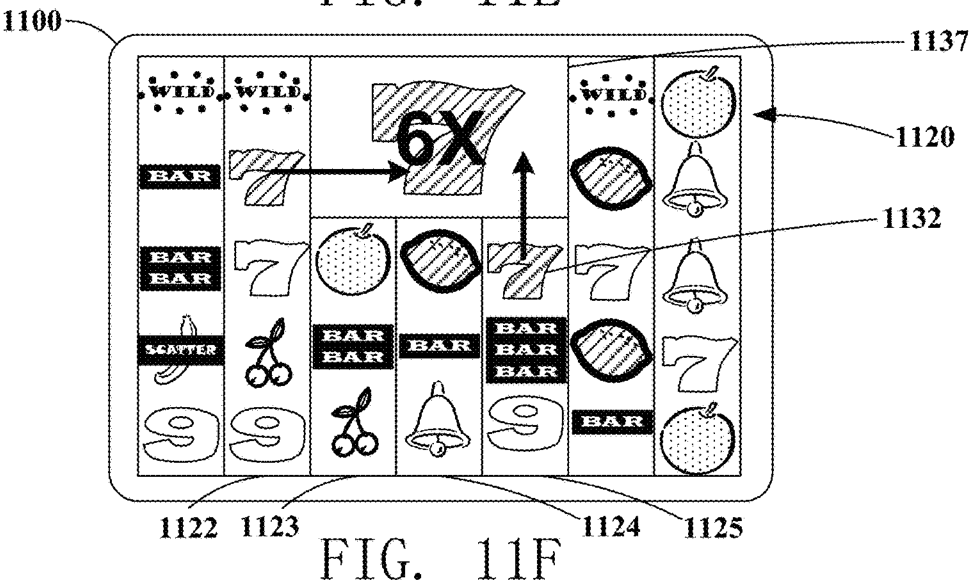

FIGS. 11A, 11B, 11C, 11D, 11E, and 11F are diagrams of a game display 1100 showing another progression of game play with a multi-reel symbol according to embodiments of the invention. Referring to FIG. 11A, a game display 1100 having a 7×5 game grid 1110 with multiple game reels 1120 is shown after the reels have stopped spinning to reveal a result of a first gaming event. The four adjacent shaded-7 symbols 1130 on reels 3 and 4 1123, 1124 are formed into a 2×2 block symbol 1135, as shown in FIG. 11B. In addition, other adjacent shaded-7 symbols 1131 (or all shaded-7 symbols in other embodiments) are drawn into the block symbol 1135 to incrementally increase a multiplier value associated with the block symbol 1136. Thus, as shown in FIGS. 11B and 11C the three other shaded-7 symbols 1131 adjacent to the block symbol 1135 are drawn into the block symbol to increase the multiplier value of the block symbol to "4×" 1136. As shown in FIG. 11D, the reels 1120 are then spun after a subsequent gaming event is initiated. The result of the subsequent gaming event is shown in FIG. 11E. Note that the symbol locations vacated by the shaded-7 symbols 1131 drawn into the block symbol 1136 have been replaced. This replacement may happen prior to spinning the reels 1120 in the subsequent gaming event, during the reel spin in the subsequent gaming event, or after the reels have come to rest in the subsequent gaming event. This replacement may be accomplished by re-indexing the remaining symbols on the reel strip, adjusting the reel strips to displace other nearby symbols into the "empty" symbol locations, or randomly selecting new symbols as replacement symbols. In other embodiments, the vacated symbol positions on the reel strip may remain as blank or ghost symbols. As shown in FIG. 11F, the resulting block 1137 may be expanded and draw in more shaded-7 symbols 1132 from reels 2 and 5 1122, 1125 based on the result of the subsequent gaming event. Although a multiplier value is associated with the block symbol 1136 in the above embodiment, other types of outcome modifiers may be associated with the block symbol in other embodiments.

Figure 12:
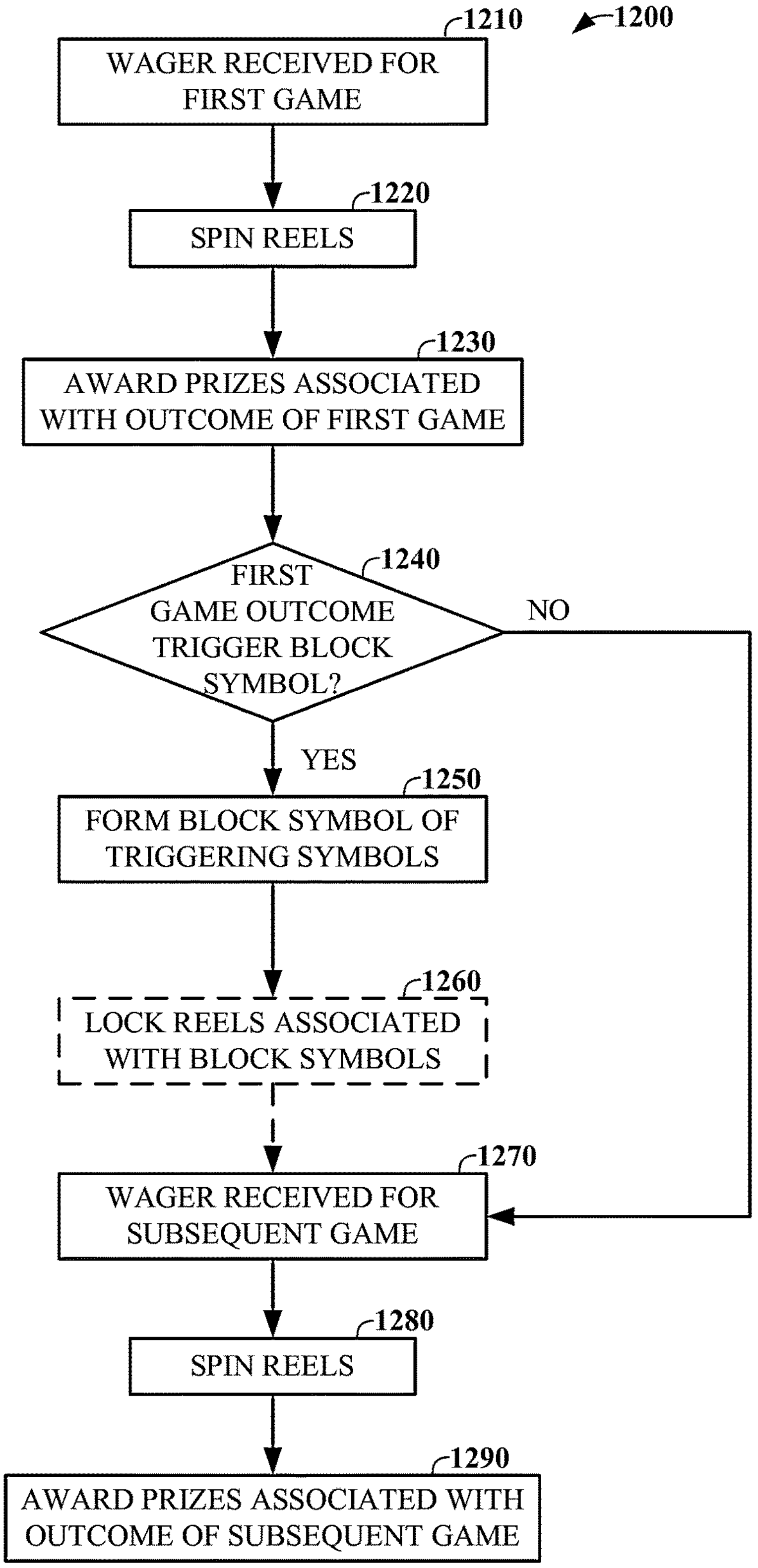
FIG. 12 is a flow diagram of a method of operating a gaming device to implement multi-reel symbols according to embodiments of the invention.

FIG. 12 is a flow diagram of a method of operating a gaming device to implement multi-reel symbols according to embodiments of the invention. Although various processes are shown in a particular order in this flow diagram, the order of these processes can be changed in other embodiments without deviating from the scope or spirit of this concept. Hence, the order of the processes shown is for illustrative purposes only and is not meant to be restrictive. Additional game processes may also be included between various processes even though they are not shown in these flow diagrams for clarity purposes. Further each of the processes may be performed by components in a single game device, such as by a game processor, or may be performed in part or whole by a remote server or processor connected to the gaming device via a network. Each process may be encoded in instructions that are stored in a memory, a computer-readable medium, or another type of storage device.

Note that this example method is just one embodiment of how a game operation can be implemented. As discussed and shown above, many variations exist which may require additional, less, or different processes to complete.

Referring to FIG. 12, flow 1200 begins with process 1210 where a wager is received in to initiate a first game (although a game could be initiated in other ways, such as an automatic trigger in a free game bonus). The game reels are spun in process 1220 to result in a game outcome for the first game. Prizes associated with the outcome of the first game are then awarded in process 1230. Flow 1200 then proceeds to process 1240 where a determination is made to form a block symbol based on the presence or lack of trigger conditions associated with the first gaming event. As discussed above, this triggering determination may include determining if identical symbols are adjacent to each other, or whether another triggering condition is present. If a triggering condition is not present as determined in process 1240, flow 1200 proceeds to process 1270 where a wager is received for a subsequent game.

If a triggering condition is present as determined in process 1240, however, flow 1200 proceeds to process 1250 where a block symbol is formed using the triggering symbols. The reels associated with the block symbol may then be locked in optional process 1260, before proceeding to process 1270 where a wager is received for a subsequent game. After the subsequent game is initiated in process 1270, the flow 1200 proceeds to process 1280 where the reels are spun (with or without the block symbol depending on the triggering condition for the first game outcome in process 1240) to result in a subsequent game outcome. Prizes are then awarded for symbol combinations associated with the game outcome of the subsequent game in process 1290.

The embodiments discussed above are primarily related to slot machine games. However, this concept can be applied to a variety of games of chance played on gaming devices.

Figure 13:
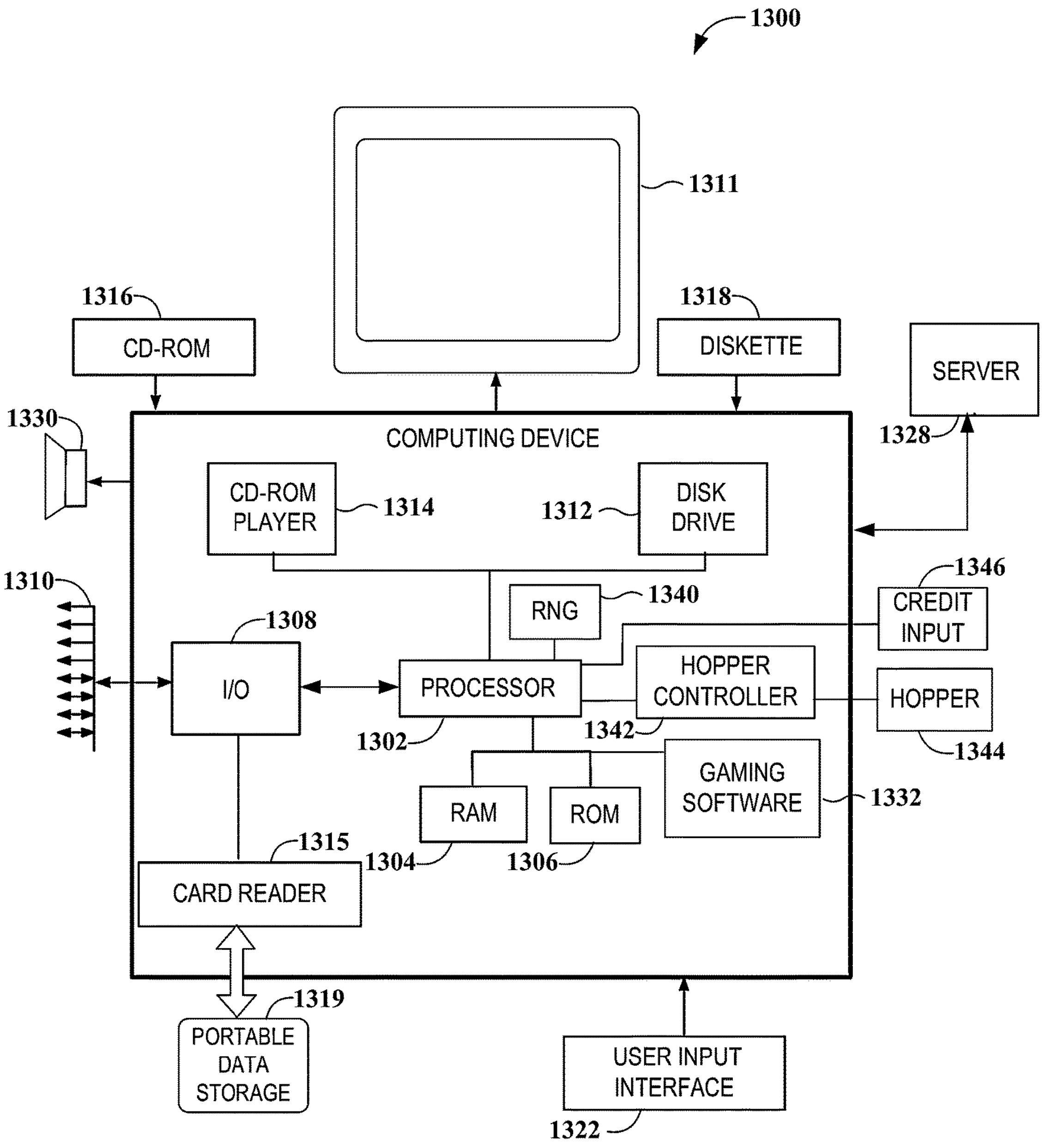
FIG. 13 is a block diagram illustrating a computing arrangement according to embodiments of the invention.

As may now be readily understood, one or more devices may be programmed to play various embodiments of the invention. The present invention may be implemented as a casino gaming machine or other special purpose gaming kiosk as described hereinabove, or may be implemented via computing systems operating under the direction of local gaming software, and/or remotely-provided software such as provided by an application service provider (ASP). The casino gaming machines utilize computing systems to control and manage the gaming activity. An example of a representative computing system capable of carrying out operations in accordance with the invention is illustrated in FIG. 13.

Hardware, firmware, software or a combination thereof may be used to perform the various gaming functions, display presentations and operations described herein. The functional modules used in connection with the invention may reside in a gaming machine as described, or may alternatively reside on a stand-alone or networked computer. The computing structure 1300 of FIG. 13 is an example computing structure that can be used in connection with such electronic gaming machines, computers, or other computer-implemented devices to carry out operations of the present invention.

The example computing arrangement 1300 suitable for performing the gaming functions in accordance with the present invention typically includes a central processor (CPU) 1302 coupled to random access memory (RAM) 1304 and some variation of read-only memory (ROM) 1306. The ROM 1306 may also represent other types of storage media to store programs, such as programmable ROM (PROM), erasable PROM (EPROM), etc. The processor 1302 may communicate with other internal and external components through input/output (I/O) circuitry 1308 and bussing 1310, to provide control signals, communication signals, and the like.

The computing arrangement 1300 may also include one or more data storage devices, including hard and floppy disk drives 1312, CD-ROM drives 1314, card reader 1315, and other hardware capable of reading and/or storing information such as DVD, etc. In one embodiment, software for carrying out the operations in accordance with the present invention may be stored and distributed on a CD-ROM 1316, diskette 1318, access card 1319, or other form of computer readable media capable of portably storing information. These storage media may be inserted into, and read by, devices such as the CD-ROM drive 1314, the disk drive 1312, card reader 1315, etc. The software may also be transmitted to the computing arrangement 1300 via data signals, such as being downloaded electronically via a network, such as the Internet. Further, as previously described, the software for carrying out the functions associated with the present invention may alternatively be stored in internal memory/storage of the computing device 1300, such as in the ROM 1306.

The computing arrangement 1300 is coupled to the display 1311, which represents a display on which the gaming activities in accordance with the invention are presented. The display 1311 represents the "presentation" of the video information in accordance with the invention, and may be any type of known display or presentation screen, such as liquid crystal displays, plasma displays, cathode ray tubes (CRT), digital light processing (DLP) displays, liquid crystal on silicon (LCOS) displays, etc.

Where the computing device 1300 represents a stand-alone or networked computer, the display 1311 may represent a standard computer terminal or display capable of displaying multiple windows, frames, etc. Where the computing device is embedded within an electronic gaming machine, the display 1311 corresponds to the display screen of the gaming machine/kiosk. A user input interface 1322 such as a mouse, keyboard/keypad, microphone, touch pad, trackball, joystick, touch screen, voice-recognition system, etc. may be provided. The display 1311 may also act as a user input device, e.g., where the display 1311 is a touch-screen device.

Chance-based gaming systems such as slot machines, in which the present invention is applicable, are governed by random numbers and processors, as facilitated by a random number generator (RNG). The fixed and dynamic symbols generated as part of a gaming activity may be produced using one or more RNGs. RNGs as known in the art may be implemented using hardware, software operable in connection with the processor 1302, or some combination of hardware and software. The present invention is operable using any known RNG, and may be integrally programmed as part of the processor 1302 operation, or alternatively may be a separate RNG controller 1340.

The computing arrangement 1300 may be connected to other computing devices or gaming machines, such as via a network. The computing arrangement 1300 may be connected to a network server 1328 in an intranet or local network configuration. The computer may further be part of a larger network configuration as in a global area network (GAN) such as the Internet. In such a case, the computer may have access to one or more web servers via the Internet. In other arrangements, the computing arrangement 1300 may be configured as an Internet server and software for carrying out the operations in accordance with the present invention may interact with the player via one or more networks.

Other components directed to gaming machine implementations include manners of gaming participant payment, and gaming machine payout. For example, a gaming machine including the computing arrangement 1300 may also include a hopper controller 1342 to determine the amount of payout to be provided to the participant. The hopper controller may be integrally implemented with the processor 1302, or alternatively as a separate hopper controller 1342. A hopper 1344 may also be provided in gaming machine embodiments, where the hopper serves as the mechanism holding the coins/tokens of the machine. The wager input module 1346 represents any mechanism for accepting coins, tokens, coupons, bills, electronic fund transfer (EFT), tickets, credit cards, smart cards, membership cards, etc., for which a participant inputs a wager amount. It will be appreciated that the primary gaming software 1332 may be able to control payouts via the hopper 1344 and controller 1342 for independently determined payout events.

Among other functions, the computing arrangement 1300 provides an interactive experience to players via input interface 1322 and output devices, such as the display 1311, speaker 1330, etc. These experiences are generally controlled by gaming software 1332 that controls a primary gaming activity of the computing arrangement 1300. The gaming software 1332 may be temporarily loaded into RAM 1304, and may be stored locally using any combination of ROM 1306, drives 1312, media player 1314, or other computer-readable storage media known in the art. The primary gaming software 1332 may also be accessed remotely, such as via the server 1328 or the Internet.

The primary gaming software 1332 in the computing arrangement 1300 is shown here as an application software module. According to embodiments of the present invention, this software 1332 provides a slot game or similar game of chance as described hereinabove. For example, the software 1332 may present, by way of the display 1311, representations of symbols to map or otherwise display as part of a slot based game having reels. However, in other embodiments, the principles of this concept may be applied to poker games or other types of games of chance. One or more aligned positions of these game elements may be evaluated to determine awards based on a paytable. The software 1332 may include instructions to provide other functionality as known in the art and described herein, such as shown and described above regarding FIGS. 1-12.

The foregoing description of the exemplary embodiments has been presented for the purposes of illustration and description. It is not intended to be exhaustive or to limit the invention to the precise form disclosed. Many modifications and variations are possible in light of the above teaching. For example, the present invention is equally applicable in electronic or mechanical gaming machines, and is also applicable to live table versions of gaming activities that are capable of being played in a table version (e.g., machines involving poker or card games that could be played via table games).

Some embodiments of the invention have been described above, and in addition, some specific details are shown for purposes of illustrating the inventive principles. However, numerous other arrangements may be devised in accordance with the inventive principles of this patent disclosure. Further, well known processes have not been described in detail in order not to obscure the invention. Thus, while the invention is described in conjunction with the specific embodiments illustrated in the drawings, it is not limited to these embodiments or drawings. Rather, the invention is intended to cover alternatives, modifications, and equivalents that come within the scope and spirit of the inventive principles set out in the appended claims.

The invention claimed is:

1. A gaming device comprising:
- a display including a video screen having a game play grid showing portions of a plurality of independent game reels;
- a player interface including at least one button, the button configured to generate a signal in response to being activated;
- a wager input device structured to identify and validate currency or currency based tickets;
- secured circuitry operable to generate random numbers; and
- game circuitry operable to:
  - receive a first game initiation signal,
  - determine an outcome for a first gaming event,
  - display the determined first game outcome in the game play grid of the display,
  - evaluate the determined first game outcome to identify winning symbol combinations,
  - provide awards associated with any identified winning symbol combinations for the first game outcome,
  - determine if two or more substantially identical symbols on a first game reel are adjacent to two or more substantially identical symbols on a second game reel in the game play grid of the display based on the first game outcome,
  - form a multi-reel symbol when two or more substantially identical symbols on the first game reel are adjacent to two or more substantially identical symbols on the second game reel by combining the two or more substantially identical symbols on the first game reel with the two or more substantially identical symbols on the second game reel,
  - receive a second game initiation signal,
  - determine an outcome for a second gaming event, where the outcome determination for the second gaming event includes using the multi-reel symbol formed from the first game outcome,
  - display the determined second game outcome in the game play grid of the display,
  - evaluate the determined second game outcome to identify winning symbol combinations, and
  - provide awards associated with any identified winning symbol combinations for the second game outcome.

2. The gaming device of claim 1, wherein the game circuitry is further operable to lock the first game reel and the second game reel together when the multi-reel symbol is formed, where locking the first and second game reel together maintains a relative alignment of the first game reel and the second game reel during the determination and display of the second game outcome.

3. The gaming device of claim 1, wherein the game circuitry is further operable to determine an anchor position for the multi-reel symbol, where the anchor position is a position associated with the two or more substantially identical symbols on the first game reel.

4. The gaming device of claim 1, wherein the game circuitry is further operable to independently select outcome positions for the first game reel and second game reel in the second gaming event, and then randomly select insertion positions for the multi-reel symbol on the first and second game reels.

5. The gaming device of claim 1, wherein the operation of the game circuitry to evaluate the determined second game outcome to identify winning symbol combinations includes evaluating the multi-reel symbol as a plurality of independent symbols.

6. The gaming device of claim 1, wherein the operation of the game circuitry to evaluate the determined second game outcome to identify winning symbol combinations includes evaluating the multi-reel symbol as a single symbol.

7. The gaming device of claim 1, wherein the operation of the game circuitry to evaluate the determined second game outcome to identify winning symbol combinations includes associating an outcome modifier with the multi-reel symbol.

8. The gaming device of claim 7, wherein the operation of the game circuitry to associated an outcome modifier with the multi-reel symbol includes associating a multiplier with the multi-reel symbol.

9. A gaming device comprising:
- a display including a video screen having a game play grid showing portions of a plurality of independent game reels;
- a player interface including at least one button, the button configured to generate a signal in response to being activated;
- a wager input device structured to identify and validate currency or currency based tickets;
- secured circuitry operable to generate random numbers; and
- game circuitry operable to:
  - receive a first game initiation signal,
  - determine an outcome for a first gaming event,
  - display the determined first game outcome in the game play grid of the display,
  - determine if a block-creating criterion is satisfied based on the determined first game outcome,
  - form a block symbol on a first game reel and a second game reel when the block-creating criterion is satisfied, the block symbol occupying symbol positions on both the first game reel and the second game reel,
  - receive a second game initiation signal,
  - determine an outcome for a second gaming event, where the outcome determination for the second gaming event includes using the block symbol formed from the first game outcome,
  - display the determined second game outcome in the game play grid of the display, and
  - evaluate the determined second game outcome to identify winning symbol combinations.

10. The gaming device of claim 9, wherein the game circuitry is further operable to eliminate the block symbol after displaying the second game outcome.

11. The gaming device of claim 9, wherein the game circuitry is further operable to determine if a block-breaking criterion is satisfied after displaying the second game outcome.

12. The gaming device of claim 11, wherein the block-breaking criterion is satisfied after a predetermined number of gaming events have been played with the block symbol.

13. The gaming device of claim 11, wherein the block-breaking criterion is satisfied when no winning symbol combinations are identified for the second game outcome.

14. The gaming device of claim 11, wherein the block-breaking criterion is satisfied when at least one winning symbol combination is identified for the second game outcome.

15. The gaming device of claim 11, wherein the block-breaking criterion is satisfied when at least a portion of the block symbol appears on the game play grid when the second game outcome is displayed.

16. The gaming device of claim 9, wherein the operation of the game circuitry to determine if a block-creating criterion is satisfied based on the determined first game outcome includes determining if a predefined symbol appears on the game play grid when the first game outcome is displayed.

17. The gaming device of claim 9, wherein the operation of the game circuitry to determine if a block-creating criterion is satisfied based on the determined first game outcome includes determining if a predefined symbol appears in a predefined position of the game play grid when the first game outcome is displayed.

18. The gaming device of claim 9, wherein the operation of the game circuitry to determine if a block-creating criterion is satisfied based on the determined first game outcome includes determining if matching sub-symbols are displayed on adjacent symbols of a first game reel and a second game reel in the game play grid.

19. The gaming device of claim 9, wherein the game circuitry is further operable to:
- determine if other symbols on the game play grid match a symbol of a formed block symbol after forming the block symbol;
- removing the matched symbols from the game play grid; and
- incrementing a multiplier associated with the block symbol for each matched symbol removed from the game play grid.

20. A gaming system connected to a game display operable to display a game play grid showing portions of a plurality of independent game reels and a player interface operable to receive player inputs, the gaming system including circuitry operable to perform processes comprising:
- receiving a first game initiation signal;
- determining an outcome for a first gaming event;
- transmitting a signal to the game display to initiate a spin sequence for the game reels;
- transmitting a signal to the game display to display the determined first game outcome in the game play grid of the game display;
- evaluating the determined first game outcome to identify winning symbol combinations;
- providing awards associated with any identified winning symbol combinations for the first game outcome;
- determining if two or more substantially identical symbols on a first game reel are adjacent to two or more substantially identical symbols on a second game reel in the game play grid of the display based on the first game outcome;
- forming a multi-reel symbol when two or more substantially identical symbols on the first game reel are adjacent to two or more substantially identical symbols on the second game reel by combining the two or more substantially identical symbols on the first game reel with the two or more substantially identical symbols on the second game reel;
- receiving a second game initiation signal;
- determining an outcome for a second gaming event, where the outcome determination for the second gaming event includes using the multi-reel symbol formed from the first game outcome;

transmitting a signal to the game display to initiate a spin sequence for the game reels;

transmitting a signal to the game display to display the determined second game outcome in the game play grid of the game display;

evaluating the determined second game outcome to identify winning symbol combinations; and providing awards associated with any identified winning symbol combinations for the second game outcome.

* * * * *